Jan. 3, 1961  J. G. MITCHELL  2,967,094
FIRED SURFACE COMBUSTION OR CATALYTIC GAS BOILER
Filed July 31, 1959  4 Sheets-Sheet 4

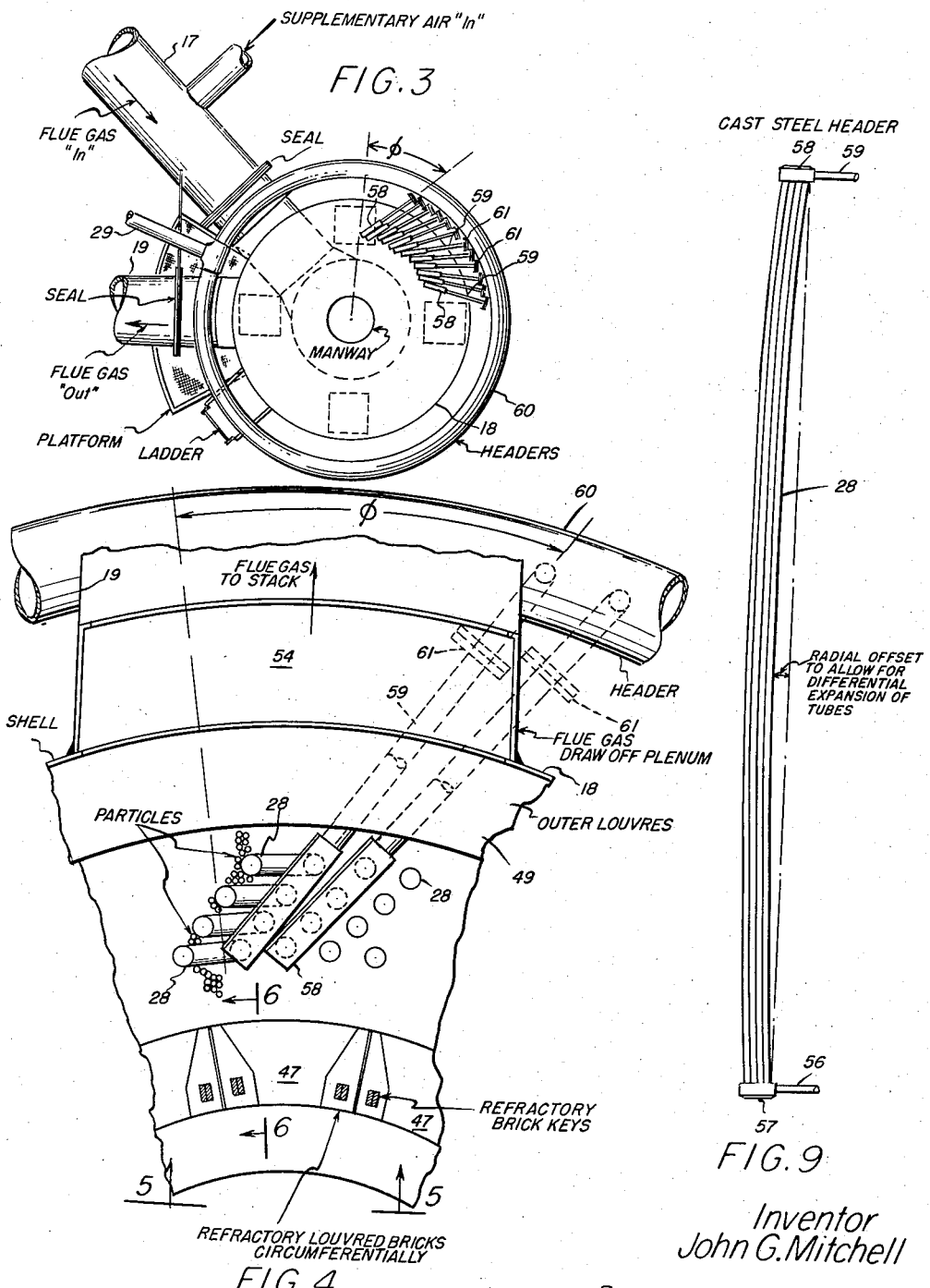

Inventor
John G. Mitchell
By Charles A. Huggett
Attorney

United States Patent Office
2,967,094
Patented Jan. 3, 1961

2,967,094

FIRED SURFACE COMBUSTION OR CATALYTIC GAS BOILER

John G. Mitchell, Larchmont, N.Y., assignor to Socony Mobil Oil Company, Inc., a corporation of New York Filed July 31, 1959, Ser. No. 830,747

6 Claims. (Cl. 23—284)

This invention relates to the complete combustion of waste gases containing combustible material and is more particularly concerned with the full and complete combustion of waste gases with the extraction of useful energy in economical and highly efficient apparatus.

While the invention can be applied to waste gas heat recovery in a variety of processes, such as carbon black manufacturing, asphalt oxidizing, bone char regeneration, iron ore reduction, etc., the invention finds particular application in the moving bed hydrocarbon convertsion process or the TCC process for cracking heavy hydrocarbons to provide additional and improved gasoline stocks.

In the TCC process a granular catalyst is passed as a compact mass through reaction and reconditioning zones in an enclosed cyclic path. The catalyst is contacted with hydrocarbons at a temperature of about 800–1000° F. in the reaction zone and cracked products are removed therefrom. The catalyst is contacted with air in the regeneration zone and combustion of the contaminant on the catalyst occurs at about 1000–1400° F. The flue gas formed is passed through a stack into the atmosphere. Incomplete combustion of the hydrocarbonaceous material on the catalyst causes a disagreeable yellow-colored plume to form in the exhaust gases and this gaseous discharge, particularly near heavily settled areas, is highly objectionable.

Steam generators designed to extract heat from waste gases are known in the prior art. Because of the relatively low temperature of these gases, however, massive heat exchanger apparatus was necessary and the apparatus proved uneconomical and not particularly efficient. The complicated construction required is illustrated in the U.S. Patent No. 2,336,833. An effort to effect a reduction of the required massive heat exchanger design is shown in the U.S. Patent No. 2,048,446 wherein a particulate mass is located about vertical heat transfer tubes and a mixture of combustible gases is passed vertically through the mass of particles to obtain a surface combustion effect resulting in a substantial rise in the temperature of the gases to effect heat radiation to the heat exchanger fluid. This surface combustion effect was disclosed by Professor W. A. Bone in Engg., Apr. 14, 1911, the advantages being stated to be the acceleration of combustion by the incandescent surface so that heat developed can be concentrated just where required and so that very high temperatures can be obtained without the use of regenerators. Professor Bone also stated that his method of surface combustion permitted energy conversion into a radiant form which is transmitted very rapidly to the object to which it is exposed. Both the Patent No. 2,048,446 and the disclosure by Professor Bone disclose passing the gas along the interior or exterior of heat tarnsfer pipes through elongated beds of particles. These systems involve high pressure drop during large volume waste gas transfer and very uneven temperature patterns because of widely different cooling effects across the bed of particles.

I have developed a waste heat boiler which mixes the waste gases with additional air and fuel in a central gas mixing zone to provide sufficient combustion to elevate the temperature of the gases above a threshold temperature level to provide a uniformly mixed supply of combustible gases. Alternatively, I propose reaching this threshold temperature level by catalytic action of combustion promoters. The gas mixing zone is made in the form of an elongated vertical cylindrical zone which is surrounded by an annular bed of particles of thin radial thickness, the gases passing laterally from the central mixing chamber to burn in the annular bed at a high surface combustion rate. Elongated heat transfer tubes are passed vertically through the annular bed in closely-spaced, staggered arrangement to provide a baffled flow of gases over the tubes to continually remix the gases, thereby providing high heat transfer rates. I provide other design innovations that make my waste heat boiler highly efficient and economical to build and operate.

The object of this invention is to overcome the defects of prior art waste heat boilers enumerated hereinabove.

A further object of this invention is to provide an improved and more efficient waste heat boiler for the combustion of waste gases.

A further object of this invention is to provide a simplified waste heat boiler operating with minimal gas pressure drop under surface combustion conditions.

A further object of this invention is to provide a method and means for preventing plume formation in moving bed conversion systems which permits the extraction of useful energy from the waste gases while applying minimal back pressure to the hydrocarbon conversion system.

These and other objects of the invention will be more particularly disclosed in the following detailed discussion of the invention which is made in conjunction with the attached drawings. While the invention has broad application to processes providing combustible waste gases at elevated temperatures, it will be disclosed for convenience with respect to its application in a moving bed catalytic cracking system, such as the TCC system. Such systems are used extensively to crack heavy hydrocarbons to increase the supply of gasoline over that found naturally occurring in petroleum removed from the ground.

Figure 3 shows a plan view of the boiler.

Figure 4 shows a detail of a plan view of the boiler as seen on plane 4—4 of Figure 2 with the shell and refractory roof removed.

Figure 9 is a detailed view of one group of heat transfer tubes attached to upper and lower connectors.

The invention will now be disclosed in detail with reference to these attached figures and as used in a TCC system, it being clearly understood that the invention has broad application to other similar systems.

Figure 1:
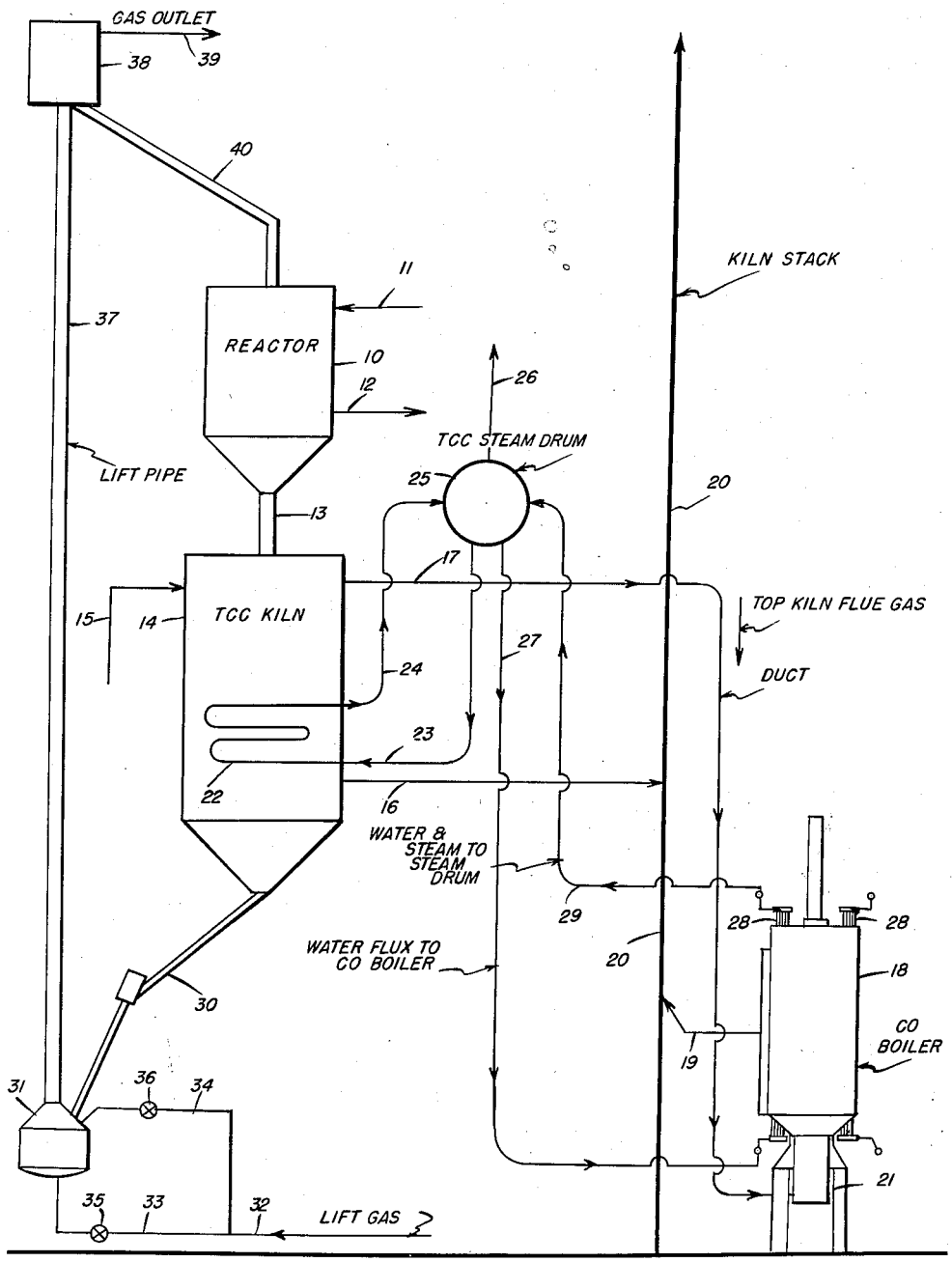
Figure 1 shows schematically a moving bed hydrocarbon conversion system in which the waste heat boiler of this invention is incorporated.

Referring now to Figure 1, there is shown schematically an enclosed moving bed system in which a granular catalyst is gravitated through a reaction zone 10 as a compact moving bed. Hydrocarbons properly prepared for treatment are introduced through the conduit 11 and travel concurrently with the catalyst, useful products being withdrawn from the conduit 12. The reaction zone is maintained at a temperature of about 800 to 1000° F. and at an advanced pressure of about 10 to 15 pounds per square inch. During reaction the hydrocarbons are cracked and a carbonaceous contaminant is located on the catalyst particles. The spent catalyst is removed from the bottom of the reactor 10 through the conduit 13 and introduced into the top of a kiln 14. This kiln is disclosed in more detail in copending application Serial Number 711,022, filed January 24, 1958. The particles gravitate as a compact mass through the kiln 14 and are contacted with air introduced through the conduit 15. The combustion takes place at a temperature of about 1000 to about 1400° F. and not substantially greater than atmospheric pressure. The flue gas formed by the combustion of the contaminant in the kiln passes in part upwardly through the bed for discharge at the upper end thereof and in part downwardly through the bed for discharge at the lower end thereof. The flue gas discharged at the lower end of the kiln through the conduit 16 is completely burned and can therefore be freely introduced into the atmosphere. The flue gas passed upwardly through the bed is not completely burned and hence useful energy could be extracted from this gas. The discharge of this stream of gas into the atmosphere has caused the formation of a yellow curling cloud in the atmosphere which is considered highly objectionable, particularly in highly populated areas. During the transfer of the catalyst from the reactor 10 to the kiln 14, there is a depressuring action which takes place and causes a certain amount of gas trapped in the pores of the catalyst to escape at the upper end of the kiln. This escaping gas adds materially to the formation of the objectionable plume, since the hydrocarbonaceous gases are not completely oxidized.

It is therefore a particular feature of this invention to take the flue gases escaping from the top of the kiln through the conduit 17 to the lower end of an elongated vertical vessel 18 for complete combustion before these gases are discharged to the atmosphere through the conduit 19 and kiln stack 20. The vessel 18 has below it a gas or oil burner 21 adapted to commingle with the spent gas or oil burner 21 adapted to commingle with the spent combustion gases a certain amount of fuel for initial combustion to elevate the temperature of these gases to a certain threshold temperature. This temperature has been found to be about 1200° F. for the gases withdrawn from the top section of a TCC kiln in a moving bed hydrocarbon conversion process. Additional air may also be supplied along with the gas or oil beneath the vertical vessel 18 to insure full and complete combustion. In order to prevent heat damage to the catalyst in the kiln because of excessive temperature, heat transfer coils 22 are located within the vessel and conduits 23 and 24 conduct water to the vessel and from the vessel to a steam drum 25. Steam can be separated from this drum and transferred through the conduit 26 for use where required. Water from this drum is taken through the conduit 27 and passed through vertical heat transfer tubes 28 which extend through the vessel 18. The water and steam formed thereby is returned through the conduit 29 to the steam drum. Hence, additional steam is formed by the combustion of the waste gases in the vertical vessel 18.

The regenerated catalyst is withdrawn from the bottom of the kiln through the conduit 30 and introduced into the lift pot 31. A stream of lift gas is passed through the conduit 32 and split into a primary stream 33 and a secondary stream 34. These streams are separately controlled by valves 35 and 36 to provide control of the flow of catalyst through a lift pipe 37 in the form of a dispersed phase or stream of separated particles flowing in a rapidly moving stream of lift gas. Such a lift is disclosed in more detail in U.S. Patent No. 2,819,121 which issued January 7, 1958, and also in copending applications Serial Number 262,639, filed December 20, 1951, and Serial Number 211,344, filed April 8, 1955. The catalyst is separated from the lift gas in the separator 38, the gas being discharged to the atmosphere through the conduit 39 and the catalyst gravitated through an elongated gravity feed leg 40 for reintroduction into the reactor 10.

Figure 2:
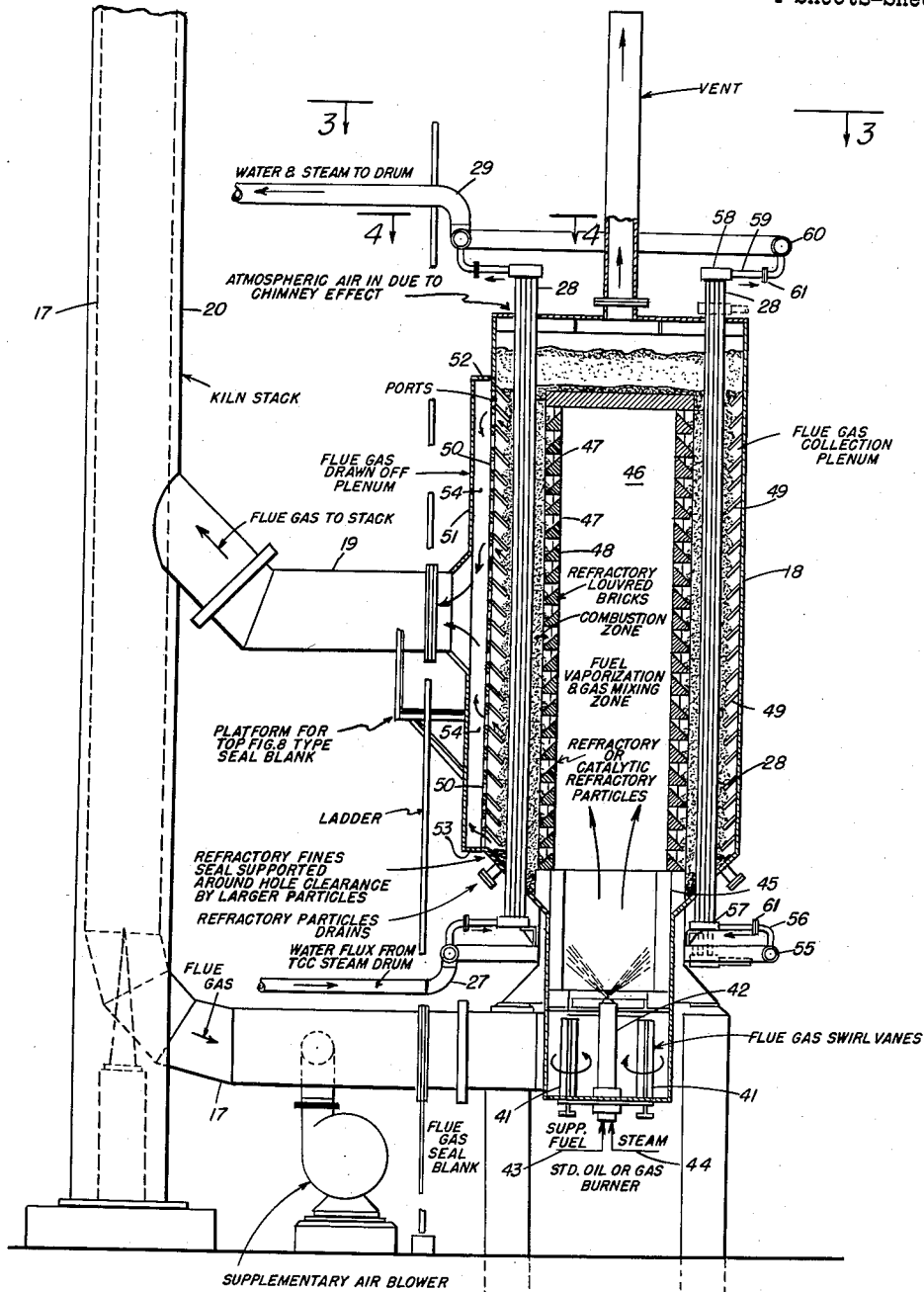
Figure 2 shows an elevational view in vertical cross-section of the waste heat boiler.

Referring now to Figure 2, the boiler is shown in more detail. The exhaust gas from the top section of the kiln is transferred through the conduit 17 and passed through the flue gas swirl vanes 41 beneath the vertical vessel 18. The swirling gas then passes upwardly and commingles with the oil or gas introduced through the nozzle 42. This supplemental fuel is introduced into the nozzle 42 through the conduit 43 and may be commingled with high temperature steam introduced into the nozzle through the conduit 44. This steam aids in the dispersion of the fuel and the commingling of the fuel with the swirling gases. The mixing gases pass immediately through the short conduit 45 into the lower end of the vessel 18. Within the vessel 18 is located an elongated vertical chamber 46 where partial combustion of the supplemental fuel takes place with a concomitant elevation of the temperature of the gases. The dispersion of the fuel and mixing of the gases is quite complete in this elongated chamber 46 and the hot gases are then passed laterally through apertures 47 in the wall of the chamber 46 for complete combustion in the refractory particles. The chamber 46 is preferably an elongated chamber of circular cross-section centrally located within the elongated cylindrical vessel 18. Between the interior wall 48 of the chamber 46 and the wall of the vessel 18 is located a relatively thin annulus. This elongated relatively thin annular region is substantially filled with granular refractory particles of a particle size to permit fairly free flow of gas therethrough. The particles may range in size from about 10 mesh up to about ½" in diameter. It is preferred to use particles of about ½" in diameter, since this particle size permits fairly free flow of gas through the annular bed of particles without substantial pressure drop and yet provides adequate mixing of the gas and turbulence of the gas during passage through the annular bed. Because the bed has a relatively thin radial thickness in comparison to its elongated height, the gas flows laterally through the bed to the outer surface thereof. A series of inverted frusto-conical baffles 49 is located spaced along the inner surface of the wall of the vessel 18 so as to support the particles and yet provide adequate free bed surface to permit ready separation of the gas from the bed of particles between these baffles. The gas can then pass circumferentially between the baffles substantially without hindrance in its flow to apertures 50 located along the side of the vessel 18. A vertical wall 51 with a top cover 52 and bottom cover 53 is located about the apertures 50 to define a plenum chamber 54 into which the gas is withdrawn. This gas is then discharged through the conduit 19 into the kiln stack 20 for release to the atmosphere. A series of vertical heat transfer tubes 28 are passed vertically through the vessel 18 and through the annular bed of particles. These tubes are placed in closely nested and staggered arrangement to cause a continuous baffling of the flow of gas passed laterally over the tubes whereby a continuous mixing of the gas occurs, thereby providing substantially uniform gas temperature. The presence of the particles and the staggered arrangement of the closely nested tubes causes a rapid combustion of the gas and supplementary fuel in contact with the particles causing a surface combustion effect which provides exceedingly high heat transfer rates by radiation from the hot particles around the tubes and by convection from the turbulent gas around the tubes to the heat transfer liquid within the tubes. The temperature during this combustion reaches a level of about 1800 to 2000° F. during the first portion of the transfer of the gas through the annular bed and a rapid cooling of this gas then occurs during its transfer through the remaining portion of the bed with the efficient extraction of a large portion of the heat by the heat transfer medium. As previously indicated, water from the TCC steam drum is passed through the conduit 27 to a ring header 55 surrounding the lower end of the vessel 18. Lower transfer pipes 56 connect to lower connectors 57, which in turn connect to a series of heat transfer tubes 28. Upper connectors 58 connect to the upper end of groups of these tubes 28 and in turn are connected by upper transfer pipes 59 to an upper ring header 60.

The details of these connections are shown more clearly on Figure 3, which is a plan view of the boiler looking down from the top of the unit. The upper transfer pipes 59 are shown in side-by-side arrangement on this figure connected to the upper connectors 58. These transfer pipes and connectors are shown at an angle $\phi$ relative to a radius drawn to the inner end of the connectors 58. This angle $\phi$ is in the neighborhood of 30 to 60 degrees, being adapted to connect with a group of heat transfer pipes 28 in separated rows so that these pipes provide the staggered arrangement of the heat transfer tubes required to provide the desired gas mixing. The transfer tubes are shown provided with connected flange joints 61 so that in the event of a breakage in any single group of heat transfer tubes, that particular group can be disconnected by blanking the flange joint 61, thereby permitting continuous operation of the waste heat boiler without interruption. To avoid local overheating the shell of vessel 18, uncooled gases passing through the bed in the blanked-off tube section will be diluted to a lower temperature by the flue gas passing circumferentially around the shell above frusto-conical baffles 49. As previously indicated, the water and steam formed as a result of heat exchange in the waste heat boiler are returned through the conduit 29 to the TCC steam drum for subsequent transfer to a desired location.

Figure 4 shows a detail view of the particle bed and the tube arrangement. The transfer pipes 59 are shown connected to the header 60 at the angle $\phi$ with the radius. This arrangement also avoids temperature stresses in the system. The connectors 58 are shown attached to a heat transfer pipe 28 in each row of heat exchanger pipes. As shown, four pipes are connected in the four circular rows of tubes. The heat transfer pipes are closely spaced but in staggered arrangement so that the tube in the second row substantially fills the space between the adjacent tubes in the first row. This forces gas passing between the tubes to contact the intervening tube in the second row and causes the gas to split over this tube and change direction. This constant splitting of the gas streams and remixing of the separated streams in forced contact with the heat exchanger tubes is a feature of this invention in that it keeps the gas temperature uniform and provides maximum efficiency in the extraction of heat energy. The wall of the mixing chamber is provided with refractory louvered bricks to permit the gas to enter the particle bed as uniformly separated streams. The radial thickness of the bed is adjusted so that, dependent upon the particle size selected, the pressure drop across the boiler and duct system is no more than about 30″ $H_2O$ and preferably no more than about 20″ $H_2O$ pressure drop. This arrangement permits the boiler to be attached to a TCC system without requiring any increase in kiln pressure. It is desirable to operate the kiln in this process at no more than about ½ to 1 pound per square inch pressure.

Figure 5:
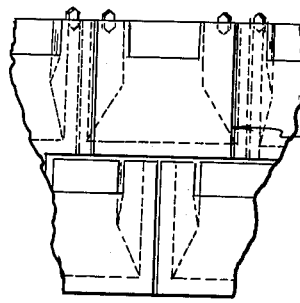
Figure 5 is a detail of a vertical view showing a gas inlet aperture as seen on plane 5—5 of Figure 4.
Figure 6:
Figure 6 shows a detailed view of the gas inlet aperture as seen on plane 6—6 of Figure 4.

Figures 5 and 6 show details of the refractory louvered bricks defining the gas inlet ports to the refractory particles in the boiler.

Figure 7:
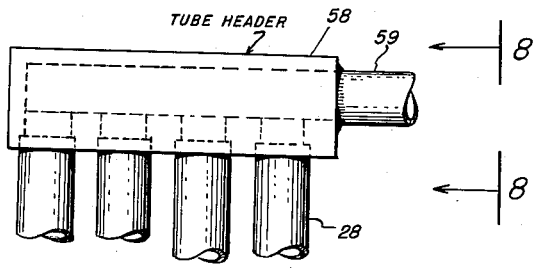
Figure 7 shows a detailed view of the connectors with heat transfer pipes attached thereto.

Figure 7 shows a tube connector with the bank of tubes 28 connected and the transfer conduit 59 attached.

Figure 8:
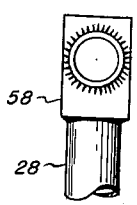
Figure 8 shows a transverse view of the connector as seen on plane 8—8 of Figure 7.

Figure 8 shows an end view of the tube connector 58 and Figure 9 shows a bank of tubes 28 with the connectors attached at the top and the bottom.

Figure 10:
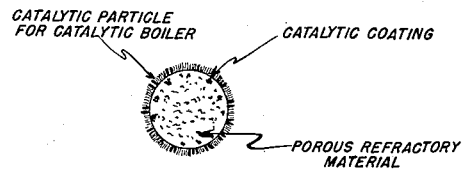
Figure 10 is a detailed view of a granular particle showing the presence of catalytic material at its outer surface.

Figure 10 shows a single particle of the granular material used in the boiler in which a porous refractory material is used in the center of the particle and an outer layer of catalytic material is located about the porous refractory material to serve as a combustion promoter to effect combustion at a lower starting temperature. This can be used with fuel added in the mixing zone or fuel can be dispensed with as desired. Suitable catalytic materials are nickel oxide, copper oxide, chromium oxide, aluminum oxide, etc., etc.

An illustrative example of the invention involves a boiler designed for use on a TCC system of a size designed to process between 15,000–30,000 bbl./day hydrocarbon charge and possessing a split-flow kiln designed to burn between 7,500–15,000 lb./hr. of coke contaminant. The flue gas from the upper end of the kiln at a pressure of 28″ of water is conducted at a flow rate of 31,000 s.c.f.m. to the boiler. This gas contains 8.7% carbon monoxide at about 800° F. Supplementary air is introduced into the flue gas stream from a supplementary air blower and a standard burner supplies 21 million B.t.u./hr. to the mixing zone to raise the gas temperature over 1200° F. The heat removed by the boiler as steam from the waste gas and the supplementary fuel firing is 56 and 16 MM B.t.u/hr., respectively. Complete combustion occurs in the inner portion of the particle bed raising the gas temperature to a peak of about 1800–2000° F. The particles are ½″ diameter refractory particles and 4 circular rows of vertical tubes are used to extract heat, the tubes being closely nested in staggered arrangement.

Gas feed to the burner is through the bottom center of the vessel, the vessel being 11 ft. 6″ in outside diameter and a height of about 25 ft. The mixing chamber is 5 ft. 4″ in diameter and 21 ft. tall. An 8″ thick roof is located over the mixing chamber and a 2 ft. bed of refractory fines is located above the roof to prevent gas bypassing the tubes and thereby serve as a seal. The pressure drop across the annular particle bed is about 9″ $H_2O$ and the gas is discharged to the stack at a pressure of about 5″ $H_2O$ and temperature of about 600° F., the gas being completely oxidized and free from plume-forming ingredients. The gas is white in color or colorless. The angle $\phi$ selected is about 40° and the transfer tubes are 2″ diameter and spaced about 4″ apart in the annular rows. The rows are located about 2″ apart and staggered to provide a closely nested tube arrangement.

The tubes are about 29⅔ feet long with a slight bend giving a 6″ radial offset at their center. All tubes are arranged with this offset in the same direction along the circumference of each row, so that with the differential thermal expansion of the tubes in each bank on heating, the tubes bow circumferentially approximately the same amount for each row, causing a rotation of the particle bed, without imposing high stress on the bed or metal parts of the apparatus combination.

The invention has been described in detail in a TCC system for illustrative purposes. The invention, of course, has broad application and such other uses of the invention as are obvious are contemplated as within the scope of the invention. The only limitations intended are contained in the attached claims.

I claim:

1. A waste gas combustor comprising in combination: an elongated upright vessel, a cylindrical gas mixing chamber centrally located within said vessel, an elongated compact bed of particles of annular cross-section and limited radial thickness surrounding said gas mixing chamber and within said vessel, a plurality of gas inlets located uniformly along the vertical wall of said gas mixing chamber, adapted for lateral gas introduction into said annular particle bed, means defining gas outlets for collecting said gas at the outer surface of said annular particle bed, coordinated with said gas inlets to effect substantially lateral gas flow through said annular bed, means for discharging said collected gas from said vessel, means for introducing gas into said gas mixing chamber, a plurality of vertical heat transfer pipes passed through said vessel and said annular particle bed, arranged in a staggered pattern of concentric rows, the distance between center lines of adjacent pipes in each row being at least not substantially greater than twice the diameter of each pipe, whereby gas passing laterally through the annular particle bed is forced to travel tortuous paths by means of the spatial arrangement of said pipes, means for introducing heat transfer fluid to one end of said heat transfer pipes and means for withdrawing heat transfer fluid from the other end of said pipes, whereby waste gases are completely burned in a minimum combustion space with minimum pressure drop and maximum heat extraction.

2. Claim 1 further characterized in that a fuel burner is attached to said gas introduction means, adapted to commingle with the gas a sufficient quantity of fuel to elevate the gas mixture in said gas mixing chamber and inner portion of refractory particle bed above a threshold temperature of about 1200° F.

3. Claim 1 further characterized in that at least a portion of the particles in the annular compact bed are at least partially formed of combustion promoting material, adapted to effect combustion of the gas passed thereover at the prevailing temperature.

4. A waste gas combustor comprising in combination: an elongated upright vessel, a cylindrical vertical interior wall centrally located within said vessel and extending from the bottom of said vessel to a level near the top thereof, adapted to define a relatively thin annulus between said wall and the vertical wall of the vessel, a circular cover horizontally located at the upper end of said vertical interior wall, forming within said wall and below said cover a gas mixing chamber, a gas inlet conduit connected below the vessel and communicating with said gas mixing chamber, a fuel conduit connected to said gas inlet conduit, an air conduit attached to said gas inlet conduit, means defining apertures in the vertical interior wall, an annular bed of compact granular particles located between said interior wall and the vertical wall of the vessel, a series of inverted frusto-conical supports attached to the inner surface of the wall of said vessel, arranged to support particles and permit gas disengagement from said particles, vertical heat exchange tubes passed through the vessel and the annular bed of particles, arranged in circular staggered rows, tube connectors attached at the upper ends of said tubes, each connector joined to one tube in each row, tube connectors attached at the lower ends of said tubes, each connector joined to one tube in each row, an upper ring header above the upper tube connectors, a lower ring header below the lower tube connectors, upper transfer pipes located between the upper connectors and the upper ring header, lower transfer pipes located between the lower connectors and the lower ring header, pipes connecting the upper and lower ring headers with a water circulating system, a bed of fine particles located above the circular cover over said gas mixing chamber and over the annular bed of particles, adapted to prevent upward gas leakage, a vent pipe attached above said vessel, means defining apertures in the wall of said vessel along the length thereof, located between adjacent frusto-conical supports, means defining a gas plenum attached to said vessel wall about said discharge apertures, and a gas discharge conduit attached to said plenum.

5. Claim 4 further characterized in that said vertical heat exchange tubes are offset from the vertical at their midpoints in a circumferential direction, thereby allowing for expansion and contraction without crushing the particles or rupturing the tubes or connectors.

6. Claim 4 further characterized in that flanged ends are joined together in each of said upper and lower transfer pipes, adapted to permit blanking leaking tube sets out of operation without interruption in the operation of the waste gas combustor.

References Cited in the file of this patent

UNITED STATES PATENTS

| | | |
|---|---|---|
| 2,303,717 | Arveson | Dec. 1, 1942 |
| 2,630,413 | Weber | Mar. 3, 1953 |
| 2,753,295 | Ramella | July 3, 1956 |